(12) United States Patent
D'Eliseo et al.

(10) Patent No.: US 11,132,044 B2
(45) Date of Patent: Sep. 28, 2021

(54) DYNAMIC P2L ASYNCHRONOUS POWER LOSS MITIGATION

(71) Applicant: Micron Technology, Inc., Boise, ID (US)

(72) Inventors: Giuseppe D'Eliseo, Caserta (IT); Xiangang Luo, Fremont, CA (US); Ting Luo, Santa Clara, CA (US); Jianmin Huang, San Carlos, CA (US)

(73) Assignee: Micron Technology, Inc., Boise, ID (US)

( * ) Notice: Subject to any disclaimer, the term of this patent is extended or adjusted under 35 U.S.C. 154(b) by 107 days.

(21) Appl. No.: 16/406,779

(22) Filed: May 8, 2019

(65) Prior Publication Data

US 2019/0346902 A1 Nov. 14, 2019

Related U.S. Application Data

(60) Provisional application No. 62/668,733, filed on May 8, 2018.

(51) Int. Cl.
*G06F 1/3206* (2019.01)
*G06F 12/06* (2006.01)
*G06F 12/02* (2006.01)
*G06F 1/3296* (2019.01)

(52) U.S. Cl.
CPC .......... *G06F 1/3206* (2013.01); *G06F 1/3296* (2013.01); *G06F 12/0246* (2013.01); *G06F 12/06* (2013.01)

(58) Field of Classification Search
CPC ..... G06F 1/3296; G06F 12/0246; G06F 12/06

USPC ........................................................ 713/320
See application file for complete search history.

(56) References Cited

U.S. PATENT DOCUMENTS

| 6,377,500 | B1* | 4/2002 | Fujimoto | G06F 12/0246 365/230.01 |
| 7,010,662 | B2* | 3/2006 | Aasheim | G06F 12/0246 711/207 |
| 8,819,385 | B2* | 8/2014 | Barsky | G06F 12/0246 711/202 |
| 8,904,092 | B2* | 12/2014 | Tucek | G06F 12/0238 711/103 |
| 2002/0091841 | A1* | 7/2002 | Beukema | G06F 12/145 709/229 |
| 2003/0115414 | A1* | 6/2003 | Tomita | G06F 11/1458 711/114 |

(Continued)

*Primary Examiner* — Paul R. Myers
(74) *Attorney, Agent, or Firm* — Schwegman Lundberg & Woessner, P.A.

(57) ABSTRACT

Systems and methods are disclosed, including, in a storage system comprising control circuitry and a memory array having multiple groups of memory cells, storing a first physical-to-logical (P2L) data structure for a first physical area of a first group of memory cells in a second physical area of the first group of memory cells, such as when resuming operation from a low-power state, including an asynchronous power loss (APL). The first group of memory cells can include a super block of memory cells. A second P2L data structure for the second physical area of the first group of memory cells can be stored, such as in a metadata area of the second physical area, and an address of the first P2L data structure can be stored in the second P2L data structure.

21 Claims, 5 Drawing Sheets

(56) References Cited

U.S. PATENT DOCUMENTS

| | | | |
|---|---|---|---|
| 2003/0163663 A1* | 8/2003 | Aasheim | G06F 12/0246 711/202 |
| 2008/0098197 A1* | 4/2008 | Craddock | G06F 12/1009 711/206 |
| 2014/0281332 A1* | 9/2014 | Koob | G06F 12/1036 711/170 |
| 2016/0018998 A1* | 1/2016 | Mohan | G06F 3/0659 711/103 |
| 2016/0098344 A1* | 4/2016 | Gorobets | G06F 3/0688 711/154 |
| 2016/0098355 A1* | 4/2016 | Gorobets | G06F 12/1009 711/203 |
| 2016/0364142 A1* | 12/2016 | Kanno | G06F 3/064 |
| 2017/0293553 A1* | 10/2017 | Heller | G06F 12/0246 |
| 2019/0303283 A1* | 10/2019 | McGlaughlin | G11C 16/349 |

\* cited by examiner

DYNAMIC P2L ASYNCHRONOUS POWER LOSS MITIGATION

CLAIM OF PRIORITY

This application claims the benefit of priority under 35 U.S.C. § 119(e) of U.S. Provisional Patent Application Ser. No. 62/668,733, filed on May 8, 2018, which is herein incorporated by reference in its entirety

BACKGROUND

Memory devices are semiconductor circuits that provide electronic storage of data for a host system (e.g., a computer or other electronic device) Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EPROM), erasable programmable ROM (PROM), resistance variable memory, such as phase change random access memory (PCRAM), resistive random-access memory (RRAM), or magnetoresistive random access memory (MRAM), among others.

A host system can include a host device including a host processor and a first amount of host memory (e.g., main memory, often volatile memory, such as DRAM) to support the host processor, and one or more storage systems (e.g., often non-volatile memory, such as flash memory) that provide additional storage to retain data in addition to or separate from the host memory.

A storage system, such as a solid-state drive (SSD), can include a memory controller and one or more memory devices, including multiple (e.g., multiple) memory dies or logical units (LUNs). In certain examples, each memory die can include multiple memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host device in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

Software (e.g., programs), instructions, operating systems (OS), and other data are typically stored on storage systems and accessed by main memory for use by the host processor. Main memory (e.g., RAM) is typically faster, more expensive, and a different type of memory (e.g., volatile) than a majority of the memory devices of the storage system (e.g., non-volatile, such as an SSD, etc.). In addition to the main memory, host systems can include different forms of volatile memory, such as a group of static memory (e.g., a cache, often SRAM), often faster than the main memory, in certain examples, configured to operate at speeds close to or exceeding the speed of the host processor, but with lower density and higher cost.

BRIEF DESCRIPTION OF THE DRAWINGS

The present disclosure is illustrated by way of example and not limitation in the figures of the accompanying drawings, in which like references indicate similar elements.

DETAILED DESCRIPTION

Aspects of the present disclosure are directed to rebuilding data structures (e.g., maps, tables, etc.) in a storage system, such as when resuming operation from a low-power state (e.g., an "off" state, such as in contrast to an "on" state) including, in a specific example, when resuming operation after an asynchronous power loss (APL). In certain examples, APL can refer to any unexpected or sudden loss of power, shutdown, or reset. Under normal circumstances, such as in response to a command to shut down (or enter sleep or hibernate modes) from a host device, etc., power is not removed from a storage system until the storage system acknowledges that unfinished write operations or saves are complete and addressing information is updated and stored. An APL may lead to data and addressing errors on the storage system, in certain examples, impacting (e.g., damaging, etc.) a physical-to-logical (P2L) data structure (e.g., table, etc.) of the storage system.

Modern memory devices, particularly non-volatile memory devices, such as NAND flash devices, etc., frequently relocate data, such as to refresh stored data or otherwise manage data in the memory devices (e.g., garbage collection, wear leveling, drive management, etc.). In certain examples, a logical block address (LBA) of the stored data can remain static, while a physical address (PA) of the stored data may change. The relationship between the LBA and the physical address can be maintained using logical-to-physical (L2P) information in an L2P data structure (e.g., an L2P map, table, etc.), typically in volatile memory (e.g., static memory, such as static random-access memory (SRAM), cache, etc.) of the storage system, such as to speed access to the physical address on the storage system given a particular LBA. Whereas the L2P data structure can be used to identify the PA of a specific LBA, a P2L data structure can be used to identify the LBA of a particular PA. The L2P information in the L2P data structure (and in certain examples, P2L information in the P2L data structure) is commonly referred to as the flash translation layer (FTL).

In an example, control circuitry of the storage system (e.g., a memory or device controller of the storage system) can be configured to manage portions of the non-volatile memory in one or more regions or subregions. L2P regions and subregions can be ranges in the logic space. For example, a 64 GB storage system can be divided into 64 1 GB regions. A 1 GB region can be divided into 16 subregions of 64 MB. If each LBA is 4 kB of data, a subregion can be formed by 16,384 consecutive LBA, and a region can be formed by 262,144 consecutive LBA. Such numbers, ranges, and sizes are illustrative, and in other examples, other numbers, ranges, and sizes can be used. Active regions or subregions can include regions or subregions currently managed by the control circuitry.

When a read command occurs, the L2P data structure can be referenced to locate the requested data. However, the size of the L2P data structure is typically larger than the available volatile memory of the storage system. One or more portions of the L2P data structure (e.g., one or more L2P regions or subregions, etc.) are typically loaded in volatile memory. A miss occurs when requested L2P information is not currently loaded in the volatile memory. In such instances, the storage system (e.g., firmware (FW) of the memory controller, etc.) can free space in the volatile memory (e.g., SRAM) by discarding or flushing to non-volatile memory (e.g., NAND) some L2P information (e.g., an L2P regions or subregions, etc.) and loading the requested L2P information (e.g., an L2P regions or subregions, etc.) from the non-volatile memory (e.g., NAND), adding latency to the read command and impacting system performance.

When data relocation or maintenance (e.g., garbage collection, etc.) occurs on the storage device, the P2L information from the P2L data structure can be read and checked against corresponding L2P information in the L2P data structure. For example, the LBA for a specific PA in the P2L data structure can be retrieved, then compared to the corresponding PA associated with the LBA in the L2P data structure to determine if the stored P2L information (or the L2P information) is valid. If the P2L information is determined to be invalid (e.g., if it does not match the L2P information), metadata of each group of data (e.g., logical unit of 4 kB of data, etc.) may be read to retrieve the LBA to confirm validity or invalidity, at great impact to storage system performance. Accordingly, although P2L information can be rebuilt, doing so may impact system performance, and systems and methods that increase reliability or robustness of P2L information can be beneficial.

There may be multiple P2L data structures in a super block. Each P2L data structure can cover one physical unit based on the size of the P2L data structure. For example, a block size can be 4 kB, and a 4 kB size P2L data structure can cover 1000 physical units (e.g., blocks) each covering 4 kB of physical area (1000*4 kB=4 MB physical area). In other examples, other size P2L data structures can be used comprising one or more pages, etc. In an example, the P2L data structure (e.g., a P2L table, etc.) for a physical area can be stored near the end of the physical area, such as at a fixed offset, etc. Each physical area can refer to a physical area of the memory array (e.g., a 4 MB physical area, etc.).

The present inventors have recognized, among other things, systems and methods to store and recover P2L data structures, such as for verification of other data or data structures or use in garbage collection, etc., for example, when resuming operation from a low-power state, including in response to, among other things, an APL. For example, if one P2L data structure encounters an APL, such that some of the data in the P2L data structure was recorded or is being recorded during an APL or a potential APL, the P2L data structure (e.g., the page or pages storing the P2L data structure, etc.) for a physical area can be stored again at a new location, such as in a subsequent physical area. In certain examples, the APL can be detected, such as when resuming operation from a low-power state without a prior or stored indication that such low-power state was entered in response to a shutdown command, etc.

In an example, a new P2L data structure can be created and stored in a subsequent physical area (e.g., a next physical area, etc.) to the physical area having the potentially impacted P2L data structure. Thus, in response to a detected APL, instead of storing the P2L information in the physical area corresponding to the P2L information, control circuitry can store P2L information for a first physical area in a second physical area (e.g., subsequent, next, etc.). In an example, a specific physical area can store P2L information for a previous physical area.

If a first P2L data structure for the first physical area is stored successfully in the second physical area, the address of the first P2L data structure can be stored in a subsequent P2L table. In certain examples, each P2L data structure (after the first P2L data structure) can store (e.g., in the metadata of the P2L data structure, etc.) the address of the previous P2L data structure to the specific P2L data structure. The address of the last P2L (AOLP2L) for each group of memory cells (e.g., each super block, etc.) in an AOLP2L data structure, in certain examples, stored in a group data structure (e.g., a system block) of the storage system.

If the P2L data structure impacted by APL can't be stored in the next physical area, such as due to an additional APL error, all data in the next physical area can be deemed invalid and the P2L data structure for the next physical area can be discarded. The systems and methods described above can be repeated in the next physical area, and so on, until we reach the last physical area of the group of memory cells and record the AOLP2L in the AOLP2L data structure. If the P2L data structure impacted or potentially impacted by APL is the last P2L of the group of memory cells (or becomes the last P2L of the group of memory cells, such as if subsequent physical areas are deemed invalid, etc.), the last P2L data structure can be stored in the group data structure and the address can be stored in the AOLP2L data structure. To determine if the P2L data structure is impacted by APL, one or more errors or error conditions in the P2L data structure can be detected, or when resuming from a low-power mode, if a prior operation was a program operation to a P2L data structure, or if it is unclear if a write to of P2L information or to a P2L data structure was completed, an impacted P2L data structure can be determined.

In an example, if an APL is detected, or upon resuming from a low-power state, an impacted P2L data structure can be presumed, and the most current or last P2L data structure written before an APL can be rebuilt and stored in the next physical area after an APL, such as described above. The storage system stores the P2L data structure, but it cannot write the L2P data structure and received data at the same time (e.g., a write and an array program may not finish at the same time). After an APL, it may be unknown whether the P2L data structure reflects all previously written data, or if all previous writes reflected in a group data structure, recording data operations, were completed before the APL.

Many storage systems write user data in pages and erase user data in blocks. Each block contains multiple (e.g., hundreds, thousands, etc.) of pages. Further, many storage systems require a page of non-volatile memory to be erased before it can be programmed again. Accordingly, all pages in a block must be ready for erasure (e.g., containing invalid data, having moved valid data, etc.) before the block is erased. In addition, non-volatile memory cells have a specific number of program/erase cycles they can tolerate before they are retired, and erase operations take more time than program operations (e.g., ~50×, etc.), and much more than read operations (e.g., ~500×, etc.). Such ratios are illustrative, not restrictive, and may vary. As used herein, a group of memory cells can include a page of memory cells, or one or more other groups, such as a block, a super block, etc.

When information stored in a page requires update, a storage system can mark the page as invalid and write updated information to a new, empty page, updating the L2P information to direct subsequent operations to the new page. The original page may eventually be erased once the remaining pages in the block are marked invalid, the remaining valid data has been moved (e.g., and the L2P information has been updated), or some combination thereof. Similarly, information marked for deletion is often marked invalid, but retained until all information in the block can otherwise be erased. Accordingly, it can be beneficial, instead of erasing impacted P2L data structures, to mark impacted or potentially impacted P2L data structures as invalid and write or rebuild the P2L data structure in another area (e.g., the next physical area, etc.) of the first group of memory cells.

Figure 1:
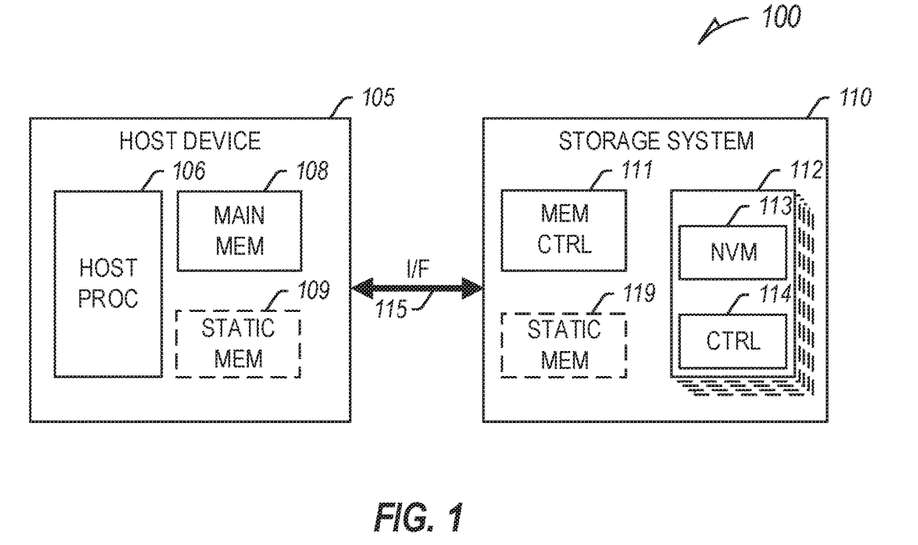
FIG. 1 illustrates an example system including a host device and a storage system.

FIG. 1 illustrates an example system (e.g., a host system) 100 including a host device 105 and a storage system 110 configured to communicate over a communication interface (I/F) 115 (e.g., a bidirectional parallel or serial communication interface). In an example, the communication interface 115 can be referred to as a host interface. The host device 105 can include a host processor 106 (e.g., a host central processing unit (CPU) or other processor or processing circuitry, such as a memory management unit (MMU), interface circuitry, etc.). In certain examples, the host device 105 can include a main memory (MAIN MEM) 108 (e.g., DRAM, etc.) and optionally, a static memory (STATIC MEM) 109, to support operation of the host processor (HOST PROC) 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage system 110 includes an eMMC device, the communication interface 115 can include multiple parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller (MEM CTRL) 111, a non-volatile memory device 112, and, optionally, a limited amount of static memory 119 to support operations of the memory controller 111. The memory controller 111 can receive instructions from the host device 105, and can communicate with the non-volatile memory device 112, such as to transfer data to (e.g., write or erase) or from (e.g., read) one or more of the memory cells of the non-volatile memory device 112.

In an example, the non-volatile memory device 112 can include multiple non-volatile memory devices (e.g., dies or LUNs), such as one or more stacked flash memory devices (e.g., as illustrated with the stacked dashes underneath the non-volatile memory device 112), etc., each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface (e.g., an Open NAND Flash Interface (ONFI) bus, etc.) separate from the communication interface 115. Control circuitry, as used herein, can refer to one or more of the memory controller 111, the device controller 114, or other periphery circuitry in the storage system 110, the non-volatile memory device 112, etc.

The non-volatile memory 113 (e.g., one or more 3D NAND architecture semiconductor memory arrays) can include multiple memory cells arranged in, for example, multiple devices, planes, blocks, physical pages, super blocks, super pages, etc. A single-level cell (SLC) can represent one bit of data per cell in one of two programmed states (e.g., 1 or 0). A multi-level cell (MLC) can represent two or more bits of data per cell in multiple programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with less (e.g., half) required write time and more (e.g., double) the program/erase (P/E) cycles as a corresponding TLC memory device. Other examples can include other numbers or arrangements. A super block can include a combination of multiple blocks, such as from different planes, etc., and a window can refer to a stripe of a super block, typically matching a portion covered by a physical-to-logical (P2L) table chunk, etc., and a super page can include a combination of multiple pages.

The term "super" can refer to a combination or multiples of a thing or things. For example, a super block can include a combination of blocks, such as multiple blocks on one or a combination of planes, devices, etc., of a storage system. If a memory device includes 4 planes, a super block may refer to the same block on each plane, or a pattern of blocks across the panes (e.g., a combination of block 0 on plane 0, block 1 on plane 1, block 2 on plane 2, and block 3 on plane 3, etc.). In an example, if a storage system includes multiple memory devices, the combination or pattern of blocks can extend across the multiple memory devices. The term "stripe" can refer to a pattern of combination or pattern of a piece or pieces of a thing or things. For example, a stripe of a super block can refer to a combination or pattern of pages from each block in the super block.

Each of the host device 105 and the storage system 110 can include a number of receiver, buffer, driver, or other interface circuits (e.g., data control units, sampling circuits, or other intermedia circuits) configured to send, receive, or process data or signals to be communicated over the communication interface 115. Control circuitry of the storage system 110 can include, among other things, circuitry or firmware, such as a number of components or integrated circuits, a memory manager to provide one or more memory management functions (e.g., wear leveling, garbage collection, error counts, block age, erase count, etc.). In an example, control circuitry of the storage system can maintain L2P information in one or more management tables, rebuild L2P data structures, maintain group data structures comprising data operations, and determine a PLJ status for one or more groups of memory cells of the storage system 110.

The memory manager can include, among other things, circuitry or firmware, such as a number of components or integrated circuits associated with various memory management functions, including, among other functions, wear leveling (e.g., garbage collection or reclamation), error detection or correction, block retirement, or one or more other memory management functions. The memory manager can parse or format host commands (e.g., commands received from the host device 105) into device commands (e.g., commands associated with operation of a memory array, etc.), or generate device commands (e.g., to accomplish various memory management functions) for the device controller 114 or one or more other components of the storage system 110.

The memory manager can include a set of management tables configured to maintain various information associated with one or more component of the storage system 110 (e.g., various information associated with a memory array or one or more memory cells coupled to the memory controller 111). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 111. In certain examples, if the number of detected errors for one or more of the error counts is above a threshold, the bit error can be referred to as an uncorrectable bit error. The management tables can maintain a count of correctable or uncorrectable bit errors, among other things. In an example, the management tables can include translation tables, L2P information, the group data structure, etc.

Control circuitry of the storage system 110 can detect or correct errors associated with writing data to or reading data from one or more memory cells of the non-volatile memory device 112. Control circuitry can actively detect and recover from error occurrences (e.g., bit errors, operation errors, etc.) associated with various operations or storage of data, while maintaining integrity of the data transferred between the host device 105 and the storage system 110, or maintaining integrity of stored data (e.g., using redundant array of independent disks (RAID) storage, etc.), and can remove (e.g., retire) failing memory resources (e.g., memory cells, memory arrays, pages, blocks, etc.) to prevent future errors.

Control circuitry can calculate an ECC upon writing a value to the non-volatile memory device 112 and store this value (e.g., in a different location on the non-volatile memory device 112). Upon reading a value from the non-volatile memory device 112, control circuitry can calculate an ECC value for the value read and compare that to the stored ECC value. If the ECC values do not match, control circuitry can determine that an error has occurred.

Control circuitry can track error handling metrics of one or more ECC processes. Examples include one or more of the number of times the error handling mechanisms are needed (e.g., EH_COUNTER), the number of times each particular error handling metric is utilized, the number of times each error handling mechanism successfully fixes an error, a latency of each error handling mechanism, and the like. In certain examples, control circuitry can include a dynamic error handling component (e.g., circuitry, processor, dedicated logic, programmable logic, firmware, etc.) to perform the operations described herein, such as one or more scan or fold operations. In some implementations, the error handling component can reorder error handling sequences during device usage based upon one more observed error handling metrics. In certain examples, the dynamic error handling component can update the order of the error handling mechanisms.

Figure 2:
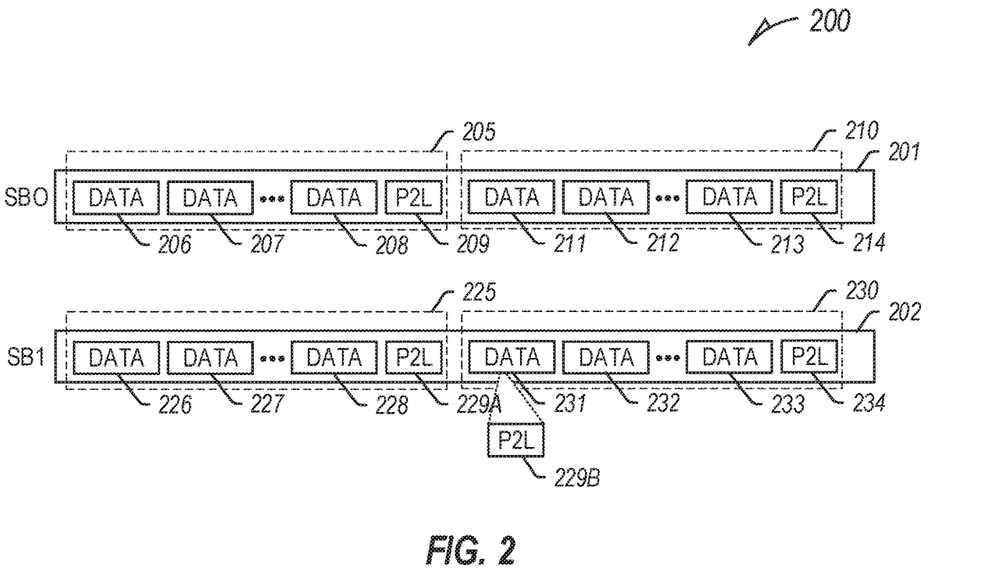
FIG. 2 illustrates example portions of first and second super blocks each having multiple physical areas and a physical-to-logical (P2L) data structure for each physical area.

FIG. 2 illustrates example portions of first and second groups of memory cells 201, 202, each having multiple physical areas and a physical-to-logical (P2L) data structure for each physical area. The groups of memory cells can include super blocks (SB) of memory cells. The first group of memory cells 201 can include a first super block of memory cells (SB0), and the second group of memory cells 202 can include a second super block of memory cells (SB1). The first group of memory cells 201 can include first and second physical areas 205, 210, and the second group of memory cells 202 can include third and fourth physical areas 225, 230. Although illustrated with only two physical areas, the first and second groups of memory cells 201, 202, can include more than two physical areas, and each physical area can include multiple subgroups (e.g., blocks) of user data.

The first physical area 205 can include a first subgroup (e.g., a first block) 206, a second subgroup 207, an Nth subgroup 208, and a first metadata area 209 configured to store metadata of the first physical area 205. The second physical area 210 can include a first subgroup (e.g., a first block) 211, a second subgroup 212, an Nth subgroup 213, and a second metadata area 214 configured to store metadata of the second physical area 210. The third physical area 225 can include a first subgroup (e.g., a first block) 226, a second subgroup 227, an Nth subgroup 228, and a third metadata area 229A. The fourth physical area 230 can include a first subgroup (e.g., a first block) 231, a second subgroup 232, an Nth subgroup 233, and a fourth metadata area 234.

In an example, under normal operation, such as when not resuming from a low-power ("off") state, when resuming from the low-power state in response to a "normal" shutdown operation (e.g., initiated by a host device, with storage system operations complete and acknowledged before shutdown, etc.), or in the absence of an asynchronous power loss (APL), etc., each of the first and second metadata areas 209, 214, can store P2L information for a respective one of the first and second physical areas 205, 210, of the first group of memory cells 201.

During abnormal operation, however, such as when resuming operation following an APL, etc., a potentially impacted P2L data structure for a specific physical area can be stored or rebuilt in a subsequent physical area. If the P2L information stored in the third metadata area 229A is potentially impacted, such as from an APL, etc., upon resuming operation, the P2L data structure for the third physical area 225 can be re-stored or rebuilt in the fourth physical area 230. In an example, the P2L data structure for the third physical area 225 can be stored in the first subgroup 231 of the fourth physical area 230, and the address (e.g., the physical address, etc.) of the location of the P2L data structure for the third physical area 225 can be stored, such as in the P2L data structure for the fourth physical area 230 (e.g., in the fourth metadata area 234). The location of the P2L data structure for the third physical area 225 in the fourth physical area 230 can become the effective third metadata area 229B.

In other examples, the P2L data structure for the third physical area 225 can be stored or rebuilt in one or more other subgroups of the fourth physical area 230. In an example, the size of the P2L data structure can be smaller than a size of the subgroup, can be equal to the size of the subgroup, or can be larger than the size of one subgroup, such that more than one subgroup is required to store the P2L data structure. In an example, each physical area (e.g., subsequent to the first physical area) can store the address of the previous physical area. The address of the P2L data structure of the last physical area of each group of memory cells can be stored in an address of the last P2L (AOLP2L) data structure, in certain examples, stored in a group data structure (e.g., a system block) on the storage system. In certain examples, if the fourth physical area 230 is invalid, the P2L data structure for the third physical area 225 can be stored in a subsequent physical area to the fourth physical area (e.g., a fifth physical area, etc.). If the fourth physical area is the last physical area of the group of memory cells, or if all subsequent physical areas in the group of memory cells are invalid, the P2L data structure for the third physical area 225 can be stored in a group data structure and the address can be stored in the AOLP2L data structure and operation can proceed to a different group of memory cells.

Figure 3:
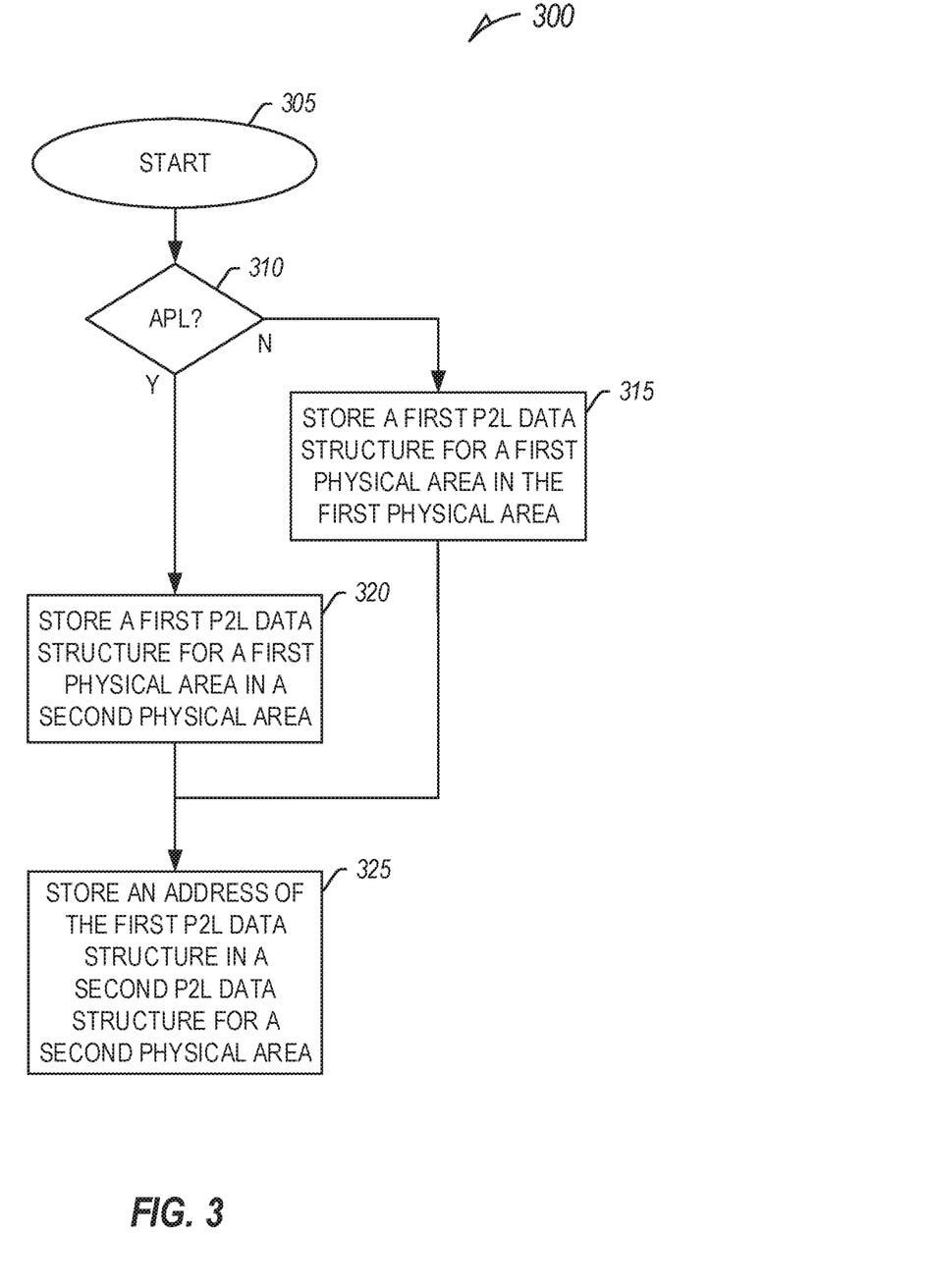
FIG. 3 illustrates an example method of storing a first physical-to-logical (P2L) data structure for a first physical area and an address of the first P2L data structure in a second P2L data structure for a second physical area.

FIG. 3 illustrates an example method 300 of storing a first physical-to-logical (P2L) data structure for a first physical area and an address of the first P2L data structure in a second P2L data structure for a second physical area. At 305, the method 300 starts, such as by control circuitry of a storage system resuming operation from a low-power state. At 310, control circuitry can determine if the preceding low-power state was a normal shutdown, or an abnormal shutdown, such as due to an asynchronous power loss (APL), etc.

If, at 310, the preceding low-power state was due to a normal shutdown operation, such that the storage system was able to complete and acknowledge all pending data operations prior to entering the low-power state, normal operation can resume, and at 315, a first P2L data structure for the first physical area can be stored, such as by the control circuitry, in the first physical area.

If, at 310, it cannot be determined whether or not the preceding low-power state was due to a normal shutdown operation, P2L information stored in a potentially impacted physical area, such as an area being written or having pending writes prior to the preceding low-power state, etc., can be rebuilt or re-stored in a subsequent physical area. At 320, the first P2L data structure for the first physical area can be stored, such as by the control circuitry, in a second physical area, subsequent to the first physical area.

At 325, an address of the first P2L data structure can be stored, such as by the control circuitry, in a second P2L data structure for a second physical area subsequent to the first physical area, such that a subsequent P2L data structure points backwards to the preceding P2L data structure.

Figure 4:
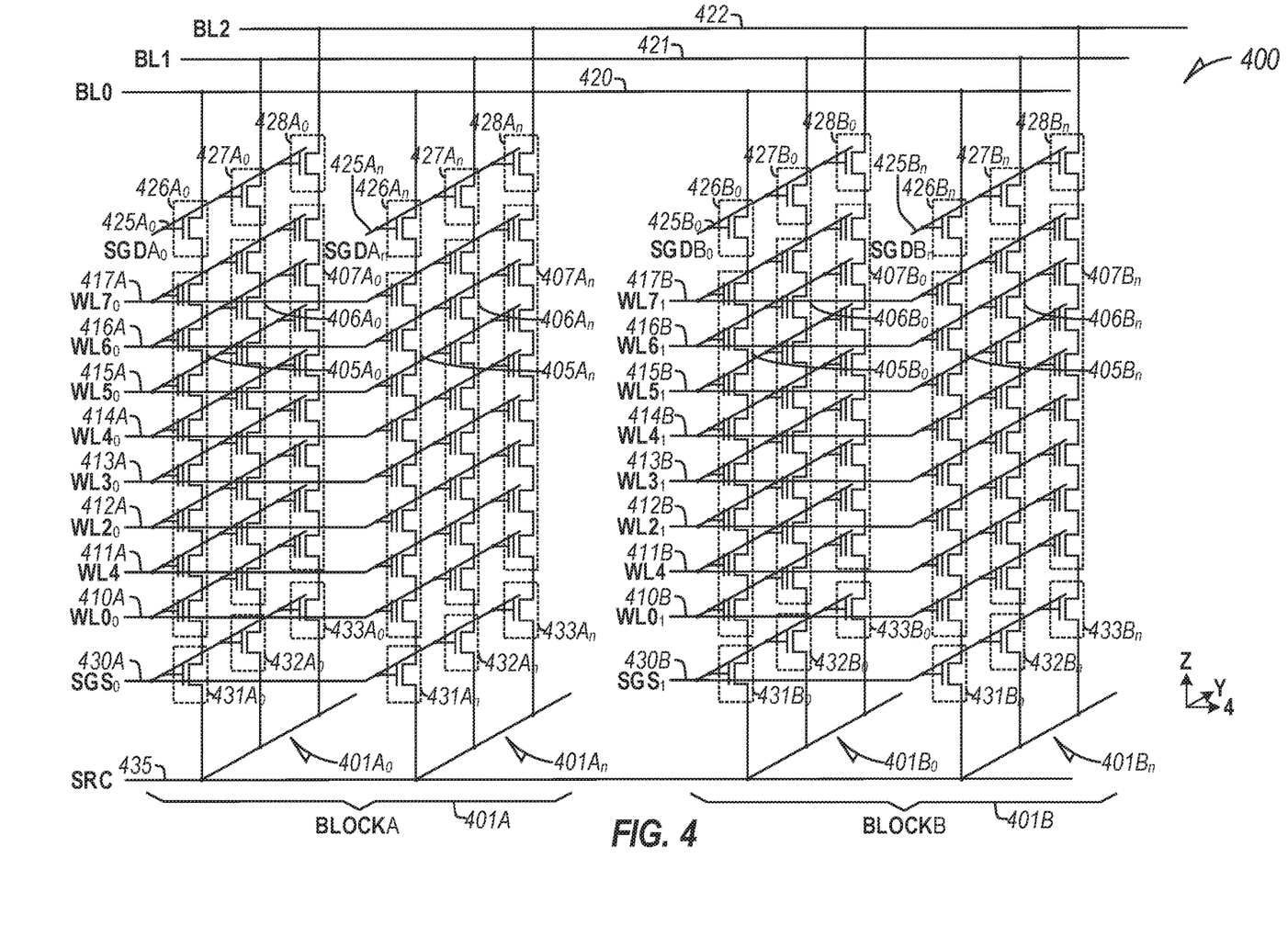
FIG. 4 illustrates an example schematic diagram of a 3D NAND architecture semiconductor memory array.

FIG. 4 illustrates an example schematic diagram of a 3D NAND architecture semiconductor memory array 400 including multiple groups of memory cells. In an example, the multiple groups can include multiple strings of memory cells (e.g., first—third $A_0$ memory strings $405A_0$-$407A_0$, first—third $A_n$ memory strings $405A_n$-$407A_n$, first—third $B_0$ memory strings $405B_0$-$407B_0$, first—third $B_n$ memory strings $405B_n$-$407B_n$, etc.), organized in blocks (e.g., block A 401A, block B 401B, etc.) and subblocks (e.g., subblock $A_0$ $401A_0$, subblock $A_n$ $401A_n$, subblock $B_0$ $401B_0$, subblock $B_n$ $401B_n$, etc.). The memory array 400 represents a portion of a greater number of similar structures that would typically be found in a block, device, or other unit of a memory device or storage system.

Each string of memory cells includes multiple tiers of storage transistors (e.g., floating gate, replacement gate, charge trapping structures, etc.) stacked in the Z direction, source to drain, between a source line (SRC) 435 or a source-side select gate (SGS) (e.g., first—third $A_0$ SGS $431A_0$-$433A_0$, first—third $A_n$ SGS $431A_n$-$433A_n$, first—third $B_0$ SGS $431B_0$-$433B_0$, first—third $B_n$ SGS $431B_n$-$433B_n$, etc.) and a drain-side select gate (SGD) (e.g., first—third $A_0$ SGD $426A_0$-$428A_0$, first—third $A_n$ SGD $426A_n$-$428A_n$, first—third $B_0$ SGD $426B_0$-$428B_0$, first—third $B_n$ SGD $426B_n$-$428B_n$, etc.). Each string of memory cells in the 3D memory array can be arranged along the X direction as data lines (e.g., bit lines (BL) BL0-BL3 420-422), and along the Y direction as physical pages.

Within a physical page, each tier represents a row of memory cells, and each string of memory cells represents a column. A subblock can include one or more physical pages. A block can include multiple subblocks (or physical pages) (e.g., 128, 256, 384, etc.). Although illustrated herein as having two blocks, each block having two subblocks, each subblock having a single physical page, each physical page having three strings of memory cells, and each string having 8 tiers of memory cells, in other examples, the memory array 400 can include more or fewer blocks, subblocks, physical pages, strings of memory cells, memory cells, or tiers. For example, each string of memory cells can include more or fewer tiers (e.g., 16, 32, 64, 128, etc.), as well as one or more additional tiers of semiconductor material above or below the storage transistors (e.g., select gates, data lines, etc.), as desired.

Each memory cell in the memory array 400 includes a control gate (CG) coupled to (e.g., electrically or otherwise operatively connected to) an access line (e.g., word lines (WL) $WL0_0$-$WL7_0$ 410A-417A, $WL0_1$-$WL7_1$ 410B-417B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first—third $A_0$ SGD $426A_0$-$428A_0$ can be accessed using an $A_0$ SGD line $SGDA_0$ $425A_0$, first—third $A_n$ SGD $426A_n$-$428A_n$ can be accessed using an $A_n$ SGD line $SGDA_n$ 425A, first—third $B_0$ SGD $426B_0$-$428B_0$ can be accessed using a $B_0$ SGD line $SGDB_0$ $425B_0$, and first—third $B_n$ SGD $426B_n$-$428B_n$ can be accessed using a $B_n$ SGD line $SGDB_n$ $425B_n$. First—third $A_0$ SGS $431A_0$-$433A_0$ and first—third $A_n$ SGS $431A_n$-$433A_n$ can be accessed using a gate select line $SGS_0$ 430A, and first—third $B_0$ SGS $431B_0$-$433B_0$ and first—third $B_n$ SGS $431B_n$-$433B_n$ can be accessed using a gate select line $SGS_1$ 430B.

In an example, the memory array 400 can include multiple levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 400 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

In operation, data is typically written to or read from the storage system in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include multiple bytes of user data (e.g., a data payload including multiple sectors of data) and its corresponding metadata, the size of the page often refers only to the number of bytes used to store the user data. As an example, a page of data having a page size of 4 kB may include 4 kB of user data (e.g., 8 sectors assuming a sector size of 512 B) as well as multiple bytes (e.g., 32 B, 54 B, 224 B, etc.) of auxiliary or metadata corresponding to the user data, such as integrity data (e.g., error detecting or correcting code data), address data (e.g., logical address data, etc.), or other metadata associated with the user data.

To program or write data to a memory cell, a programming voltage (Vpgm) (e.g., one or more programming pulses, etc.) can be applied to selected word lines (e.g., $WL4_0$), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as $WL4_0$, a pass voltage of 10V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_0$, a pass voltage of 8V can be applied to $WL2_0$ and $WL6_0$, a pass voltage of 7V can be applied to $WL1_0$ and $WL7_0$, etc. In other examples, the pass voltages, or number of word lines, etc., can be higher or lower, or more or less.

Data is often stored arbitrarily on the storage system as small units. Even if accessed as a single unit, data can be received in small, random 4-16 k single file reads (e.g., 60% 80% of operations are smaller than 16 k). It is difficult for a user and even kernel applications to indicate that data should be stored as one sequential cohesive unit. File systems are typically designed to optimize space usage, and not sequential retrieval space. Sense amplifiers can be coupled to one or more of the data lines (e.g., first, second, or third bit lines (BL0-BL2) 420-422), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or subblocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 5:
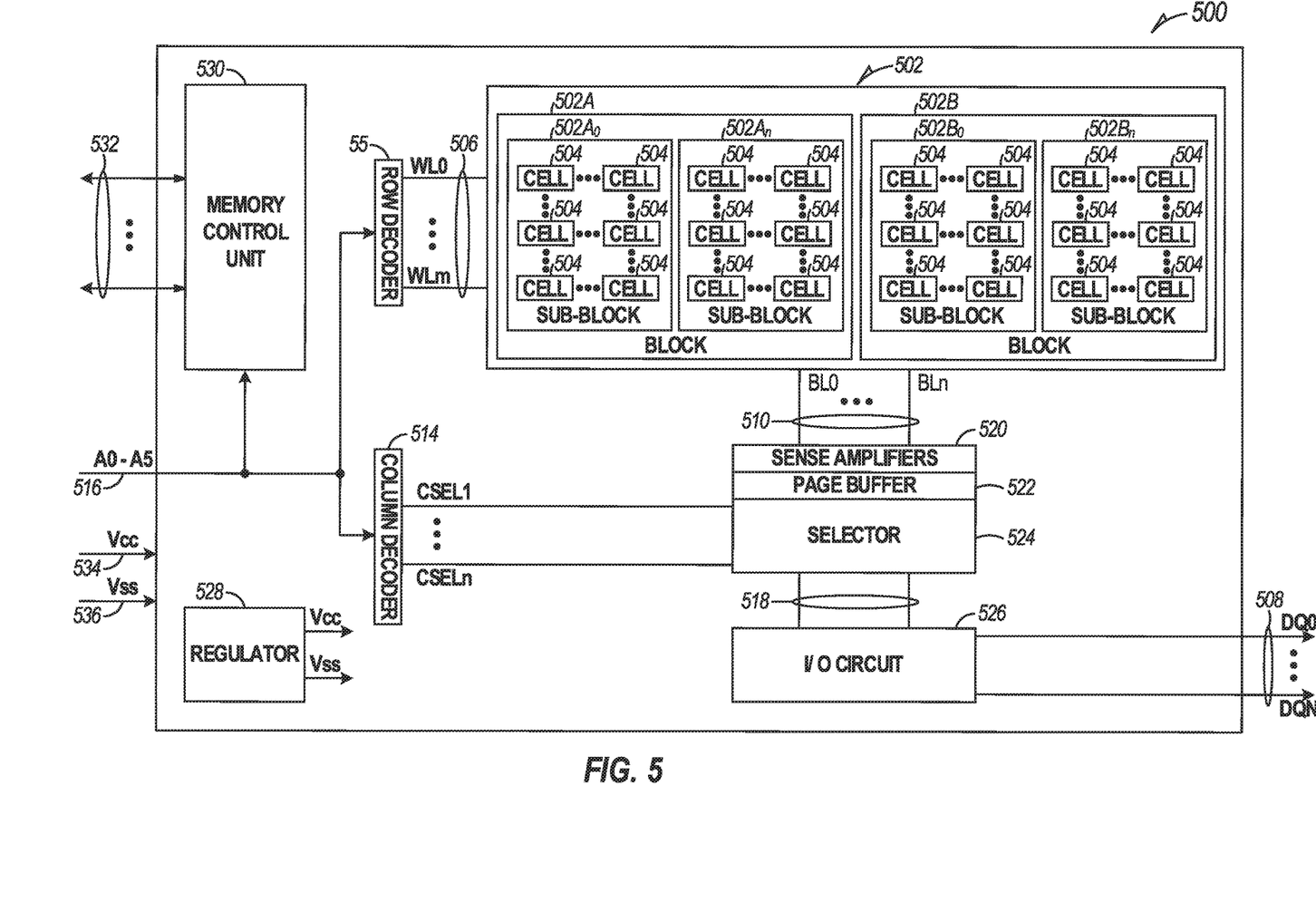
FIG. 5 illustrates an example block diagram of a memory device.

FIG. 5 illustrates an example block diagram of a storage system 500 including a memory array 502 having a plurality of memory cells 504, and one or more circuits or components to provide communication with, or perform one or more memory operations on, the memory array 502. Although shown with a single memory array 502, in other examples, one or more additional memory arrays, dies, or LUNs can be included herein. In certain examples, in a storage system having multiple dies or LUNs, the storage system 500 can represent a block diagram of circuits and components for each die or LUN. The storage system 500 can include a row decoder 512, a column decoder 514, sense amplifiers 520, a page buffer 522, a selector 524, an input/output (I/O) circuit 526, and a memory control unit 530.

The memory cells 504 of the memory array 502 can be arranged in blocks, such as first and second blocks 502A, 502B. Each block can include subblocks. For example, the first block 502A can include first and second subblocks $502A_0$, $502A_n$, and the second block 502B can include first and second subblocks $502B_0$, $502B_n$. Each subblock can include multiple physical pages, each page including multiple memory cells 504. Although illustrated herein as having two blocks, each block having two subblocks, and each subblock having multiple memory cells 504, in other examples, the memory array 502 can include more or fewer blocks, subblocks, memory cells, etc. In other examples, the memory cells 504 can be arranged in multiple rows, columns, pages, subblocks, blocks, etc., and accessed using, for example, access lines 506, first data lines 510, or one or more select gates, source lines, etc.

The memory control unit 530 can control memory operations of the storage system 500 according to one or more signals or instructions received on control lines 532, including, for example, one or more clock signals or control signals that indicate a desired operation (e.g., write, read, erase, etc.), or address signals (A0-AX) received on one or more address lines 516. One or more devices external to the storage system 500 can control the values of the control signals on the control lines 532, or the address signals on the address line 516. Examples of devices external to the storage system 500 can include, but are not limited to, a host, a memory controller, a processor, or one or more circuits or components not illustrated in FIG. 5.

The storage system 500 can use access lines 506 and first data lines 510 to transfer data to (e.g., write or erase) or from (e.g., read) one or more of the memory cells 504. The row decoder 512 and the column decoder 514 can receive and decode the address signals (A0-AX) from the address line 516, can determine which of the memory cells 504 are to be accessed, and can provide signals to one or more of the access lines 506 (e.g., one or more of a plurality of word lines (WL-WLm)) or the first data lines 510 (e.g., one or more of a plurality of bit lines (BL0-BLn)), such as described above.

The storage system 500 can include sense circuitry, such as the sense amplifiers 520, configured to determine the values of data on (e.g., read), or to determine the values of data to be written to, the memory cells 504 using the first data lines 510. For example, in a selected string of memory cells 504, one or more of the sense amplifiers 520 can read a logic level in the selected memory cell 504 in response to a read current flowing in the memory array 502 through the selected string to the data lines 510.

One or more devices external to the storage system 500 can communicate with the storage system 500 using the I/O lines (DQ0-DQN) 508, address lines 516 (A0-AX), or control lines 532. The input/output (I/O) circuit 526 can transfer values of data in or out of the storage system 500, such as in or out of the page buffer 522 or the memory array 502, using the I/O lines 508, according to, for example, the control lines 532 and address lines 516. The page buffer 522 can store data received from the one or more devices external to the storage system 500 before the data is programmed into relevant portions of the memory array 502, or can store data read from the memory array 502 before the data is transmitted to the one or more devices external to the storage system 500.

The column decoder 514 can receive and decode address signals (A0-AX) into one or more column select signals (CSEL1-CSELn). The selector 524 (e.g., a select circuit) can receive the column select signals (CSEL1-CSELn) and select data in the page buffer 522 representing values of data to be read from or to be programmed into memory cells 504. Selected data can be transferred between the page buffer 522 and the I/O circuit 526 using second data lines 518.

The memory control unit 530 can receive positive and negative supply signals, such as a supply voltage (Vcc) 534 and a negative supply (Vss) 536 (e.g., a ground potential), from an external source or supply (e.g., an internal or external battery, an AC-to-DC converter, etc.). In certain examples, the memory control unit 530 can include a regulator 528 to internally provide positive or negative supply signals.

Figure 6:
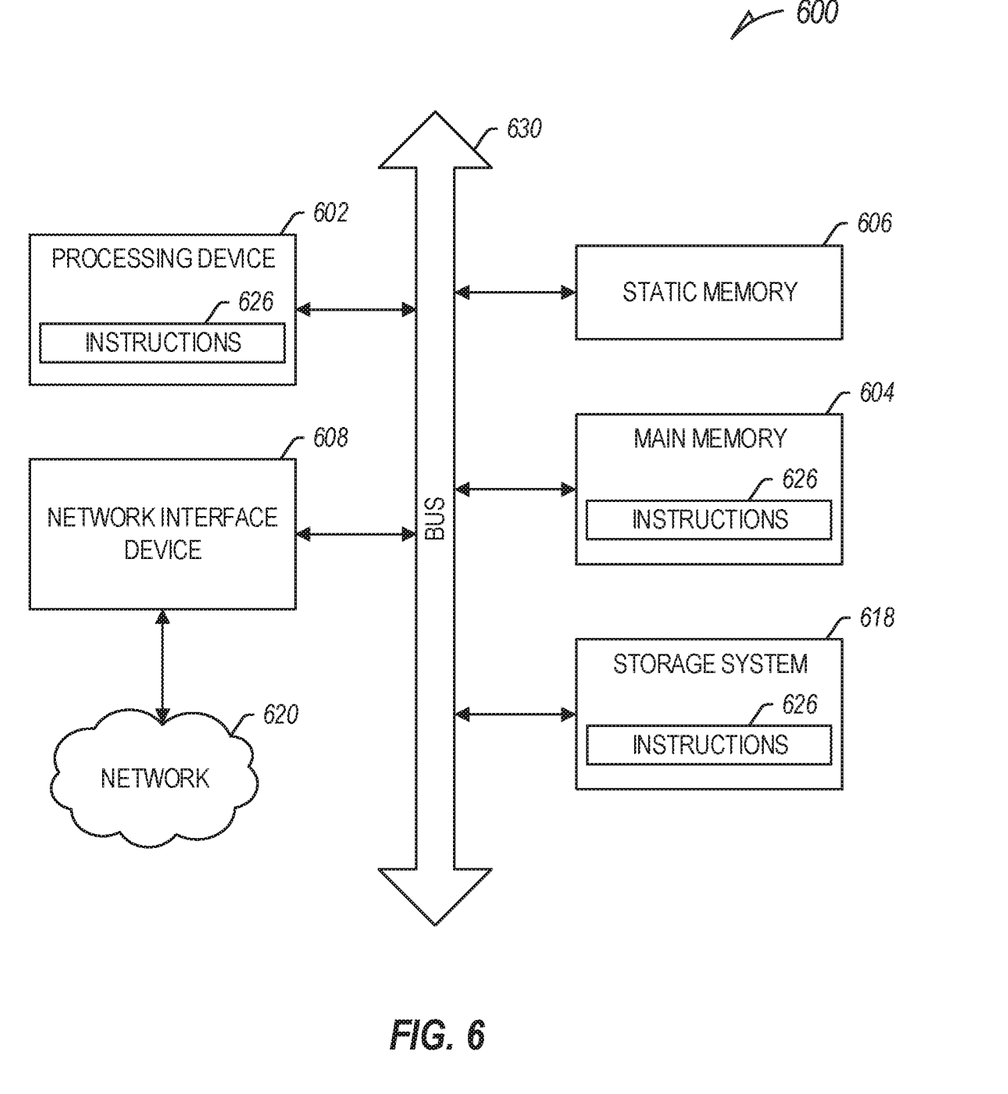
FIG. 6 illustrates a block diagram of an example machine upon which any one or more of the techniques (e.g., methodologies) discussed herein may perform.

FIG. 6 illustrates a block diagram of an example machine (e.g., a host system) 600 upon which any one or more of the techniques (e.g., methodologies) discussed herein may perform (e.g., such as those described in FIG. 1, etc.). In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 600 may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM) such as synchronous DRAM (SDRAM) or Rambus DRAM (RDRAM), etc.), a static memory 606 (e.g., static random-access memory (SRAM), etc.), and a storage system 618, some or all of which may communicate with each other via a communication interface (e.g., a bus) 630.

The processing device 602 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The computer system 600 can further include a network interface device 608 to communicate over a network 620.

The storage system 618 can include a machine-readable storage medium (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the computer system 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the storage system 618 can be accessed by the main memory 604 for use by the processing device 602. The main memory 604 (e.g., DRAM) is typically fast, but volatile, and thus a different type of storage than the storage system 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the storage system 618 can be allocated to supplement the main memory 604; however, because the storage system 618 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 618 for virtual memory can greatly reduce the usable lifespan of the storage system 618.

The instructions 624 may further be transmitted or received over a network 620 using a transmission medium via the network interface device 608 utilizing any one of multiple transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMV), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a storage system, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the storage system as they occur, tracking the operations of the storage system it initiates, evaluating the storage system characteristics corresponding to a wear state, etc.)

According to one or more embodiments of the present disclosure, a memory access device may be configured to provide wear cycle information to the storage system with each memory operation. The storage system control circuitry (e.g., control logic) may be programmed to compensate for storage system performance changes corresponding to the wear cycle information. The storage system may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Example 1 is a system comprising: a storage system comprising control circuitry and a memory array having multiple groups of memory cells, wherein the control circuitry, when resuming operation from a low-power state, is configured to store a first physical-to-logical (P2L) data structure for a first physical area of a first group of memory cells in a second physical area of the first group of memory cells, and wherein the control circuitry is configured to: store a second P2L data structure for the second physical area of the first group of memory cells; and store an address of the first P2L data structure in the second P2L data structure.

In Example 2, the subject matter of Example 1 optionally wherein to store the first P2L data structure for the first physical area of the first group of memory cells in the second physical area, the control circuitry is configured to store the first P2L data structure for the first physical area of the first group of memory cells in a block of user data in the second physical area of the first group of memory cells.

In Example 3, the subject matter of any one or more of Examples 1-2 optionally include wherein to store the second P2L data structure for the second physical area, the control circuitry is configured to store the second P2L data structure for the second physical area in a metadata area of the second physical area.

In Example 4, the subject matter of any one or more of Examples 1-3 optionally include wherein to store the second P2L data structure for the second physical area, the control circuitry is configured to store the second P2L data structure for the second physical area in a block of user data in a third physical area of the first group of memory cells.

In Example 5, the subject matter of any one or more of Examples 1-4 optionally include wherein to store the address of the first P2L data structure, the control circuitry is configured to store a physical address of the first P2L data structure in a metadata area of the second P2L data structure.

In Example 6, the subject matter of any one or more of Examples 1-5 optionally include wherein the first group of memory cells comprises a number (N) physical areas, comprising the first physical area, the second physical area, and an Nth physical area, and wherein the control circuitry is configured to store an address of an Nth P2L data structure for the Nth physical area of the first group of memory cells in a group data structure.

In Example 7, the subject matter of any one or more of Examples 1-6 optionally include wherein the groups of memory cells comprise super blocks of memory cells, each super block comprising multiple blocks of memory cells, each block comprising multiple pages of memory cells, each page comprising multiple memory cells.

In Example 8, the subject matter of any one or more of Examples 1-7 optionally include wherein resuming operation from the low-power state comprises resuming operation in response to an asynchronous power loss (APL).

Example 9 is a method comprising: storing, using control circuitry of a storage system, when resuming operation from a low-power state, a first physical-to-logical (P2L) data structure for a first physical area of a first group of memory cells in a second physical area of the first group of memory cells of a memory array having multiple groups of memory cells; storing, using the control circuitry, a second P2L data structure for the second physical area of the first group of memory cells; and storing, using the control circuitry, an address of the first P2L data structure in the second P2L data structure.

In Example 10, the subject matter of Example 9 optionally includes wherein storing the first P2L data structure for the first physical area of the first group of memory cells in the second physical area comprises storing the first P2L data structure for the first physical area of the first group of memory cells in a block of user data in the second physical area of the first group of memory cells.

In Example 11, the subject matter of any one or more of Examples 9-10 optionally include wherein storing the second P2L data structure for the second physical area comprises storing the second P2L data structure for the second physical area in a metadata area of the second physical area.

In Example 12, the subject matter of any one or more of Examples 9-11 optionally include wherein storing the second P2L data structure for the second physical area comprises storing the second P2L data structure for the second physical area in a block of user data in a third physical area of the first group of memory cells.

In Example 13, the subject matter of any one or more of Examples 9-12 optionally include wherein storing the address of the first P2L data structure comprises storing a physical address of the first P2L data structure in a metadata area of the second P2L data structure.

In Example 14, the subject matter of any one or more of Examples 9-13 optionally include wherein the first group of memory cells comprises a number (N) physical areas, comprising the first physical area, the second physical area, and an Nth physical area, wherein the method comprises: storing an address of an Nth P2L data structure for the Nth physical area of the first group of memory cells in a group data structure.

In Example 15, the subject matter of any one or more of Examples 9-14 optionally include wherein resuming operation from the low-power state comprises resuming operation in response to an asynchronous power loss (APL).

Example 16 is at least one non-transitory device-readable storage medium comprising instructions that, when executed by a control circuitry of a storage system, cause the control circuitry to perform operations comprising: storing, when resuming operation from a low-power state, a first physical-to-logical (P2L) data structure for a first physical area of a first group of memory cells in a second physical area of the first group of memory cells of a memory array having multiple groups of memory cells; storing a second P2L data structure for the second physical area of the first group of memory cells; and storing an address of the first P2L data structure in the second P2L data structure.

In Example 17, the subject matter of Example 16 optionally includes wherein storing the first P2L data structure for the first physical area of the first group of memory cells in the second physical area comprises storing the first P2L data structure for the first physical area of the first group of memory cells in a block of user data in the second physical area of the first group of memory cells.

In Example 18, the subject matter of any one or more of Examples 16-17 optionally include wherein storing the second P2L data structure for the second physical area comprises storing the second P2L data structure for the second physical area in a metadata area of the second physical area.

In Example 19, the subject matter of any one or more of Examples 16-18 optionally include wherein storing the second P2L data structure for the second physical area comprises storing the second P2L data structure for the second physical area in a block of user data in a third physical area of the first group of memory cells.

In Example 20, the subject matter of any one or more of Examples 16-19 optionally include wherein storing the address of the first P2L data structure comprises storing a physical address of the first P2L data structure in a metadata area of the second P2L data structure.

In Example 21, the subject matter of any one or more of Examples 16-20 optionally include wherein the first group of memory cells comprises a number (N) physical areas, comprising the first physical area, the second physical area, and an Nth physical area, and wherein the operations comprise storing an address of an Nth P2L data structure for the Nth physical area of the first group of memory cells in a group data structure.

In Example 22, the subject matter of any one or more of Examples 16-21 optionally include wherein resuming operation from the low-power state comprises resuming operation in response to an asynchronous power loss (APL).

In Example 23, subject matter (e.g., a system or apparatus) may optionally combine any portion or combination of any portion of any one or more of Examples 1-22 to comprise "means for" performing any portion of any one or more of the functions or methods of Examples 1-22, or at least one "non-transitory machine-readable medium" including instructions that, when performed by a machine, cause the machine to perform any portion of any one or more of the functions or methods of Examples 1-22.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:
1. A system comprising:
 a storage system comprising control circuitry and a memory array having multiple groups of memory cells, wherein the control circuitry, when resuming operation from a low-power state, is configured to store a first physical-to-logical (P2L) data structure for a first physical area of a first group of memory cells in a block of user data in a second physical area of the first group of memory cells, and wherein the control circuitry is configured to:
store a second P2L data structure for the second physical area of the first group of memory cells; and
store an address of the first P2L data structure in the second P2L data structure.

2. The system of claim 1, wherein to store the second P2L data structure for the second physical area, the control circuitry is configured to store the second P2L data structure for the second physical area in a metadata area of the second physical area.

3. The system of claim 1, wherein to store the second P2L data structure for the second physical area, the control circuitry is configured to store the second P2L data structure for the second physical area in a block of user data in a third physical area of the first group of memory cells.

4. The system of claim 1, wherein to store the address of the first P2L data structure, the control circuitry is configured to store a physical address of the first P2L data structure in a metadata area of the second P2L data structure.

5. The system of claim 1, wherein the first group of memory cells comprises a number (N) physical areas, comprising the first physical area, the second physical area, and an Nth physical area, and
wherein the control circuitry is configured to store an address of an Nth P2L data structure for the Nth physical area of the first group of memory cells in a group data structure.

6. The system of claim 1, wherein the groups of memory cells comprise super blocks of memory cells, each super block comprising multiple blocks of memory cells, each block comprising multiple pages of memory cells, each page comprising multiple memory cells.

7. The system of claim 1, wherein resuming operation from the low-power state comprises resuming operation in response to an asynchronous power loss (APL).

8. A method comprising:
storing, using control circuitry of a storage system, when resuming operation from a low-power state, a first physical-to-logical (P2L) data structure for a first physical area of a first group of memory cells in a block of user data in a second physical area of the first group of memory cells of a memory array having multiple groups of memory cells;
storing, using the control circuitry, a second P2L data structure for the second physical area of the first group of memory cells; and
storing, using the control circuitry, an address of the first P2L data structure in the second P2L data structure.

9. The method of claim 8, wherein storing the second P2L data structure for the second physical area comprises storing the second P2L data structure for the second physical area in a metadata area of the second physical area.

10. The method of claim 8, wherein storing the second P2L data structure for the second physical area comprises storing the second P2L data structure for the second physical area in a block of user data in a third physical area of the first group of memory cells.

11. The method of claim 8, wherein storing the address of the first P2L data structure comprises storing a physical address of the first P2L data structure in a metadata area of the second P2L data structure.

12. The method of claim 8, wherein the first group of memory cells comprises a number (N) physical areas, comprising the first physical area, the second physical area, and an Nth physical area, wherein the method comprises:
storing an address of an Nth P2L data structure for the Nth physical area of the first group of memory cells in a group data structure.

13. The method of claim 8, wherein resuming operation from the low-power state comprises resuming operation in response to an asynchronous power loss (APL).

14. The method of claim 8, wherein the groups of memory cells comprise super blocks of memory cells, each super block comprising multiple blocks of memory cells, each block comprising multiple pages of memory cells, each page comprising multiple memory cells.

15. At least one non-transitory device-readable storage medium comprising instructions that, when executed by a control circuitry of a storage system, cause the control circuitry to perform operations comprising:
storing, when resuming operation from a low-power state, a first physical-to-logical (P2L) data structure for a first physical area of a first group of memory cells in a block of user data in a second physical area of the first group of memory cells of a memory array having multiple groups of memory cells;
storing a second P2L data structure for the second physical area of the first group of memory cells; and
storing an address of the first P2L data structure in the second P2L data structure.

16. The at least one non-transitory device-readable storage medium of claim 15, wherein storing the second P2L data structure for the second physical area comprises storing the second P2L data structure for the second physical area in a metadata area of the second physical area.

17. The at least one non-transitory device-readable storage medium of claim 15, wherein storing the second P2L data structure for the second physical area comprises storing the second P2L data structure for the second physical area in a block of user data in a third physical area of the first group of memory cells.

18. The at least one non-transitory device-readable storage medium of claim 15, wherein storing the address of the first P2L data structure comprises storing a physical address of the first P2L data structure in a metadata area of the second P2L data structure.

19. The at least one non-transitory device-readable storage medium of claim 15, wherein the first group of memory cells comprises a number (N) physical areas, comprising the first physical area, the second physical area, and an Nth physical area, and
wherein the operations comprise storing an address of an Nth P2L data structure for the Nth physical area of the first group of memory cells in a group data structure.

20. The at least one non-transitory device-readable storage medium of claim 15, wherein resuming operation from the low-power state comprises resuming operation in response to an asynchronous power loss (APL).

21. The at least one non-transitory device-readable storage medium of claim 15, wherein the groups of memory cells comprise super blocks of memory cells, each super block comprising multiple blocks of memory cells, each block comprising multiple pages of memory cells, each page comprising multiple memory cells.

* * * * *